United States Patent
Yano et al.

(10) Patent No.: US 6,882,164 B2
(45) Date of Patent: Apr. 19, 2005

(54) ELECTROSTATIC CAPACITANCE SENSOR AND FINGERPRINT COLLATOR COMPRISING IT

(75) Inventors: Motoyasu Yano, Kanagawa (JP); Masaki Yoshioka, Kanagawa (JP); Keiichi Shinozaki, Kanagawa (JP)

(73) Assignee: Sony Corporation (JP)

( * ) Notice: Subject to any disclaimer, the term of this patent is extended or adjusted under 35 U.S.C. 154(b) by 178 days.

(21) Appl. No.: 10/362,758

(22) PCT Filed: Jul. 4, 2002

(86) PCT No.: PCT/JP02/06814

§ 371 (c)(1),
(2), (4) Date: Feb. 26, 2003

(87) PCT Pub. No.: WO03/006925

PCT Pub. Date: Jan. 23, 2003

(65) Prior Publication Data

US 2004/0096061 A1 May 20, 2004

(30) Foreign Application Priority Data

Jul. 12, 2001 (JP) .................................. 2001-211796

(51) Int. Cl.[7] ............................ G01R 27/26; G06K 9/00
(52) U.S. Cl. ...................... 324/663; 324/672; 382/124; 713/186
(58) Field of Search ................................. 324/658, 663, 324/672, 679; 380/59; 382/124; 713/186

(56) References Cited

U.S. PATENT DOCUMENTS 5,451,940 A     9/1995 Schneider et al.
5,991,467 A  * 11/1999 Kamiko ....................... 382/124
6,195,447 B1 *  2/2001 Ross ........................... 382/124
6,438,257 B1 *  8/2002 Morimura et al. ........... 382/124
6,556,935 B1 *  4/2003 Morimura et al. ........... 702/104
6,681,033 B1 *  1/2004 Yano et al. .................. 382/124

FOREIGN PATENT DOCUMENTS

| | | |
|---|---|---|
| DE | 43 40 472 A1 | 4/1995 |
| JP | 63-159746 A1 | 7/1988 |
| JP | 64-61669 A1 | 3/1989 |
| JP | 3-237594 A1 | 10/1991 |
| JP | 4-503713 A1 | 7/1992 |
| JP | 11-326409 A1 | 11/1999 |
| JP | 2000-65664 A1 | 3/2000 |
| JP | 2000-213908 A1 | 8/2000 |

OTHER PUBLICATIONS

International Search Report for PCT/JP02/06814 dated Oct. 15, 2002.

* cited by examiner

Primary Examiner—N. Le
Assistant Examiner—Timothy J. Dole
(74) Attorney, Agent, or Firm—Ronald P. Kananen; Rader, Fishman & Grauer PLLC (57) ABSTRACT

A capacitance sensor usable as a fingerprint sensor is provided in which a timing controller (16) provides such a switching control as to first cause a switch (SA) in a sensor cell (100-$k$) to turn on to set the potential at a sense electrode to a reference potential and then a switch SB to turn on after the switch (SA) is turned off, whereby charge is stored from the sensor cell (100-$k$) into a reference capacitance Cf1 of a sensing circuit (13-$k$), the sensitivity of sensing the capacitance is raised by increasing the number of times the charge storage is repeated and only signal components are extracted by reducing noise components by averaging.

5 Claims, 10 Drawing Sheets

ELECTROSTATIC CAPACITANCE SENSOR AND FINGERPRINT COLLATOR COMPRISING IT

TECHNICAL FIELD

The present invention generally relates to a capacitance sensor and a fingerprint identification system or dactyloscopy system using the capacitance sensor, and, more particularly, to a capacitance sensor suitable for use as a fingerprint sensor and a fingerprint identification system using the capacitance sensor.

BACKGROUND ART

Figure 1:
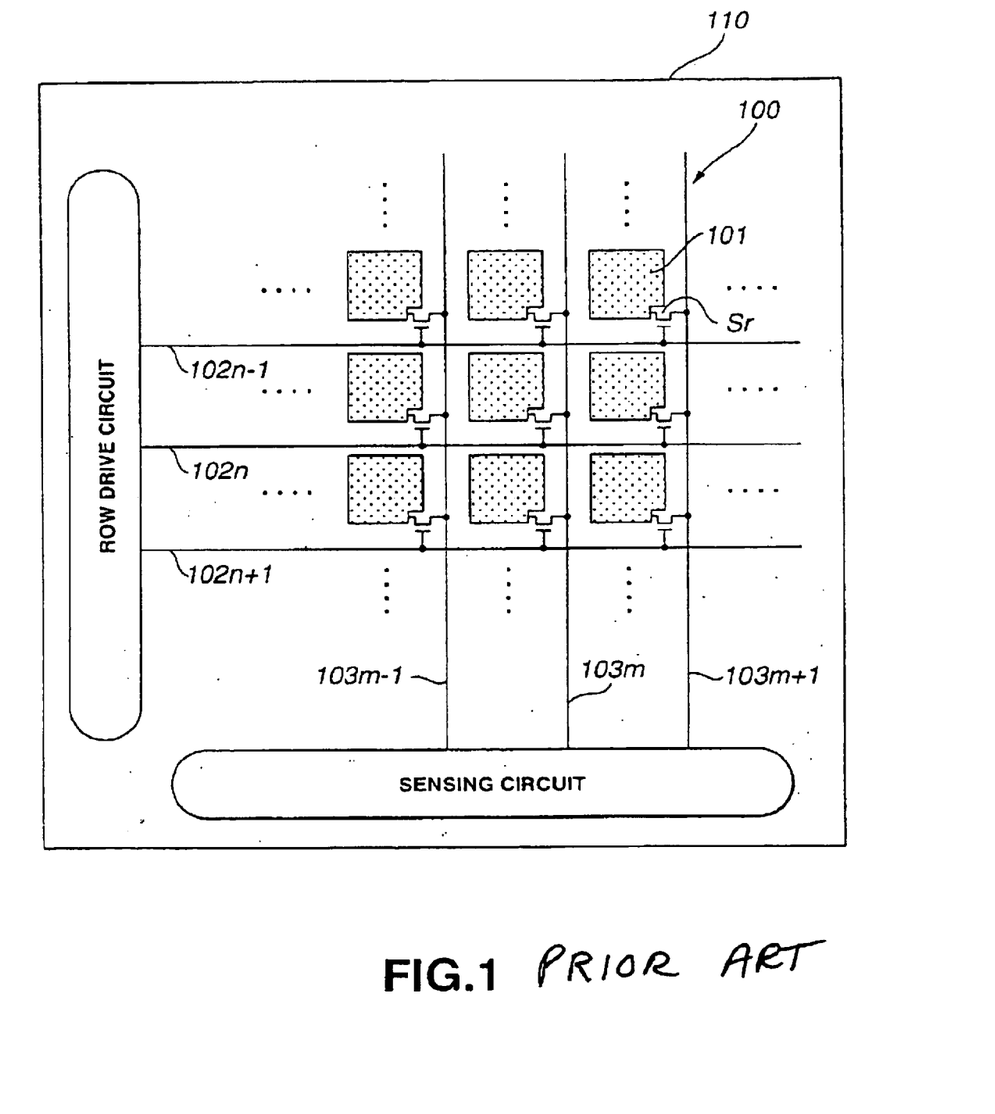
FIG. 1 is a schematic diagram of the fingerprint sensor, showing its basic circuitry.

Heretofore, there have been proposed various types of fingerprint sensors. A typical one of them is shown in FIG. 1. The fingerprint sensor is generally indicated with a reference 110. The fingerprint sensor 110 includes a sensor cell 100 formed from an array of sense electrodes 101 laid on the surface of a semiconductor, a matrix of row select lines ..., $102n-1$, $102n$, $102n+1$, ... and column sense lines ..., $103m-1$, $103m$, $103m+1$, ..., positioned correspondingly to the sense electrodes 101, and cell select switches Sr connected between each of the sense electrodes 101 and column sense lines ..., $103m-1$, $103m$, $103m+1$, .... The cell select switches Sr are selected row by row via the row select lines ..., $102n-1$, $102n$, $102n+1$.

Figure 2:
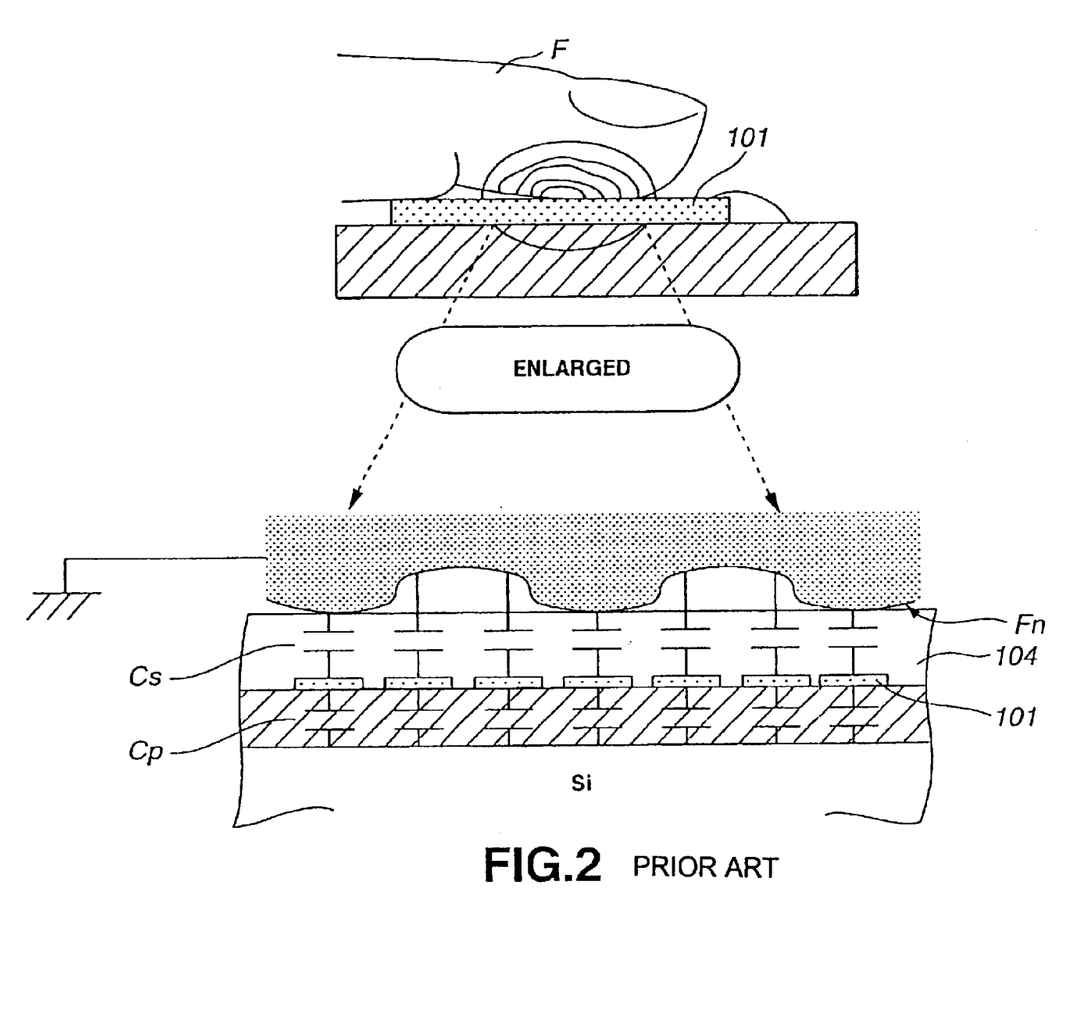
FIG. 2 shows the principle of the fingerprint sensor which senses a capacitance.

As shown in FIG. 2, when a finger F is placed on an overcoat 104 covering the sense electrodes 101 of the fingerprint sensor 110, a capacitance Cs develops between the sense electrode 101 and the surface Fn of the finger F correspondingly to irregularities of the fingerprint. The capacitance Cs is sensed to recognize a fingerprint pattern. More specifically, when a portion of the finger corresponding to a ridge portion of a fingerprint is on the sense electrode 101, the capacitance Cs developed between the sense electrode 101 and the finger surface will be large since the distance between the finger portion and the sense electrode 101 is short. On the other hand, when a portion of the finger corresponding to a valley portion of the fingerprint is on the sense electrode 101, the capacitance Cs will be small since the distance between the finger portion and the sense electrode 101 is long. Thus, by sensing the capacitance Cs, it is possible to recognize a pattern of the fingerprint. It should be noted that a capacitance Cp in FIG. 2 is a parasitic one between the sense electrode 101 and a Si (silicon) substrate.

To sense a capacitance Cs, it has been proposed to charge a capacitance Cs at a constant voltage and sense a charge stored in the capacitance Cs. This method is known as "voltage charging method". Also, there has been proposed a method in which a constant charge is charged to the capacitance Cs and a voltage variation is sensed. This is known as "charge charging method".

Figure 3:
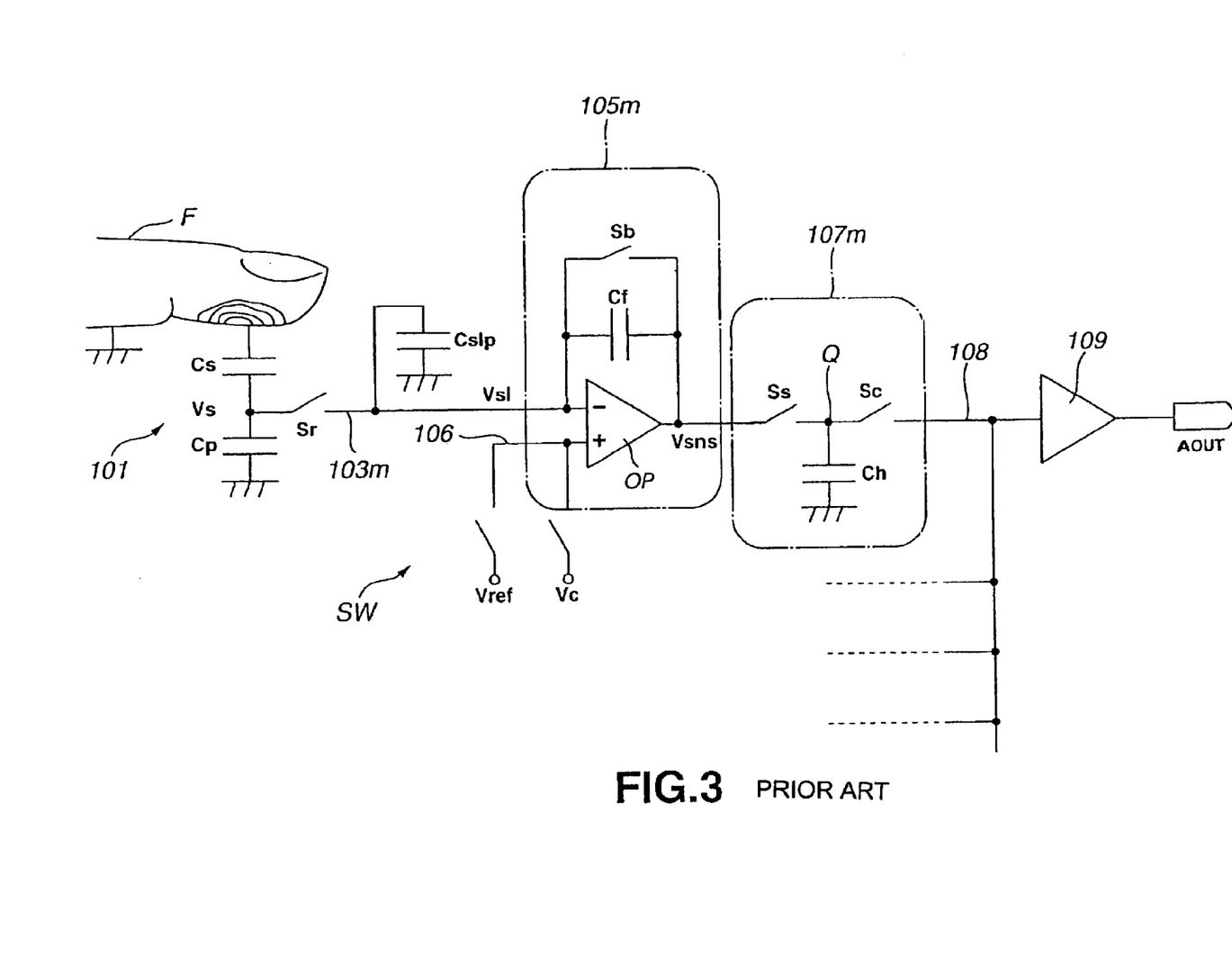
FIG. 3 is a circuit diagram showing the principle of the voltage charging method.

First, an example of the voltage charging method will be described with reference to the circuit diagram in FIG. 3 showing the principle of the method. The method will be described taking the circuitry of m columns shown in FIG. 1 by way of example.

As shown in FIG. 3, a sensing circuit $105m$ is connected to one end of each column sense line $103m$ in the m columns. The sensing circuit $105m$ includes an operational amplifier OP connected at the negative-phase (−) input terminal thereof to one end of the column sense line $103m$ and at the positive-phase (+) input terminal thereof to a voltage supply line 106, a reference capacitance Cf connected between the negative-phase input terminal and the output terminal of the operational amplifier OP, and a reset switch Sb connected in parallel to the reference capacitance Cf. The voltage supply line 106 is selectively applied with a constant charging voltage Vc or a predetermined reference voltage Vref via a select switch SW.

A sample & hold circuit $107m$ is connected at the input terminal thereof to the output terminal of the sensing circuit $105m$, namely, to the output terminal of the operational amplifier OP. The sample & hold circuit $107m$ includes a sampling switch Ss and column select switch Sc connected in series between the output terminal of the sensing circuit $105m$ and an output signal line 108, and a hold capacitance Ch connected between a common junction Q between the switches Ss and Sc and the ground potential. Signal output from the sample & hold circuit $107m$ is delivered at the output signal line 108 via an output buffer 109.

Because of the circuit construction, the sensing circuit $105m$ provides a following output voltage Vsns:

$$Vsns = -(Cs/Cf) \times \Delta V$$

where Cs is a capacitance to be sensed and $\Delta V$ is a charging voltage to the capacitance Cs. As will be evident from the above expression, the charging voltage $\Delta V$ to the sense electrode 101 should be increased or the reference capacitance Cf should be decreased in order to raise the sensitivity of sensing the capacitance Cs.

Figure 4:
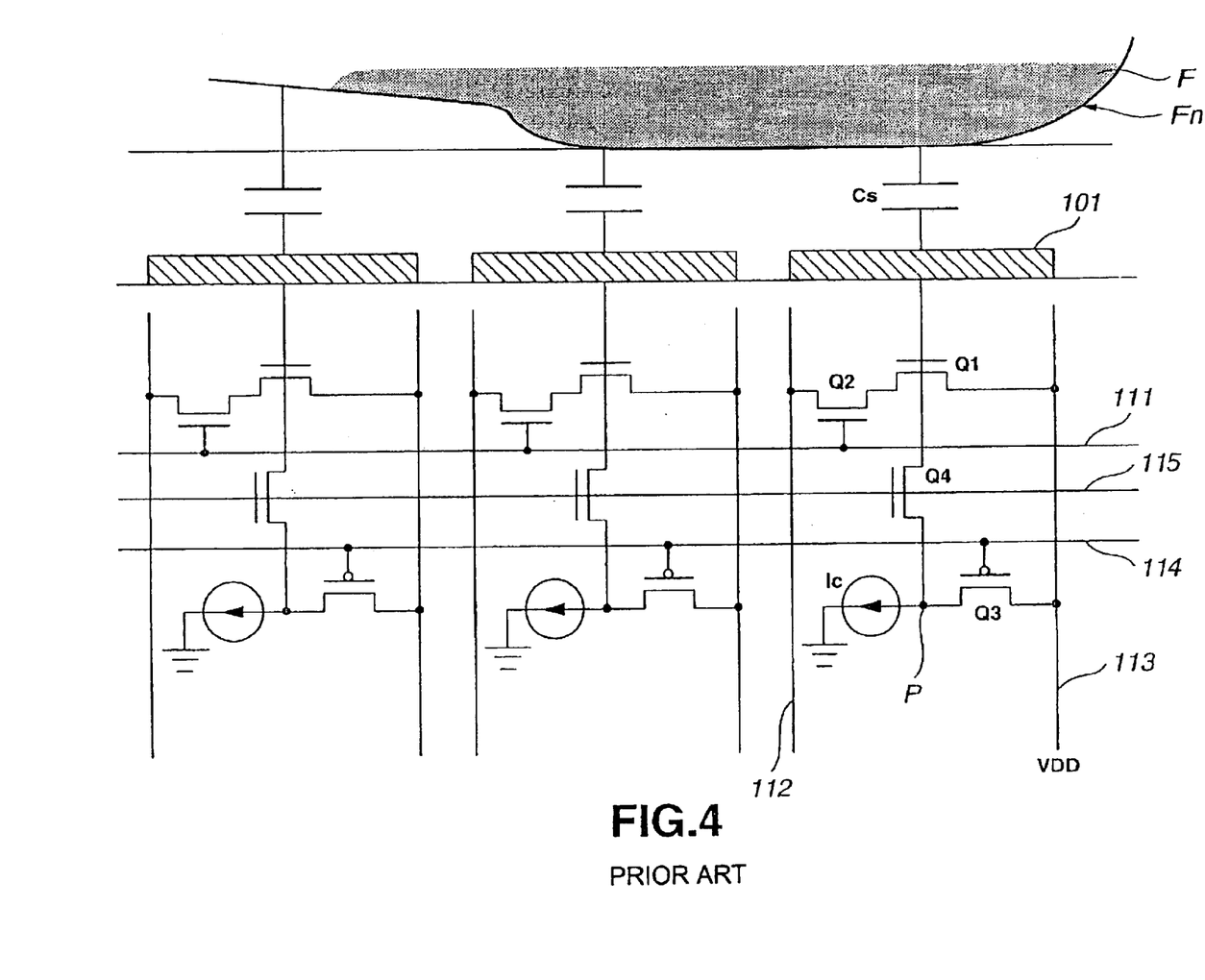
FIG. 4 is a circuit diagram showing the principle of the charge charging method.

Next, an example of the charge charging method will be described with reference to the circuit diagram in FIG. 4 showing the principle of the method.

As shown in FIG. 4, row drive lines 111 and column sense lines 112 are laid in the form of a matrix in relation to the sense electrodes 101 laid in the form of an array. A source-follower Nch MOS transistor Q1 and an Nch MOS transistor Q2 to select a row are connected in series between a power line 113 and a column sense line 112. The MOS transistor Q1 is connected at the gate thereof to the sense electrode 101, and the MOS transistor Q2 is connected at the gate thereof to the row drive line 111.

A Pch MOS transistor Q3 and charging current source Ic are connected in series between the power line 113 and the ground potential. The MOS transistor Q3 is connected at the gate thereof to a reset line 114. The common junction P of the MOS transistor Q3 and the charging current source Ic is connected to the sense electrode 101 via an Nch MOS transistor Q4. The MOS transistor Q4 is connected at the gate thereof to a charge control line 115.

The sensing circuit constructed as above is provided for each sense electrode 101, namely, for each sensor cell. The sensing circuit operates as will be described below with reference to the timing chart in FIG. 5.

Figure 5:
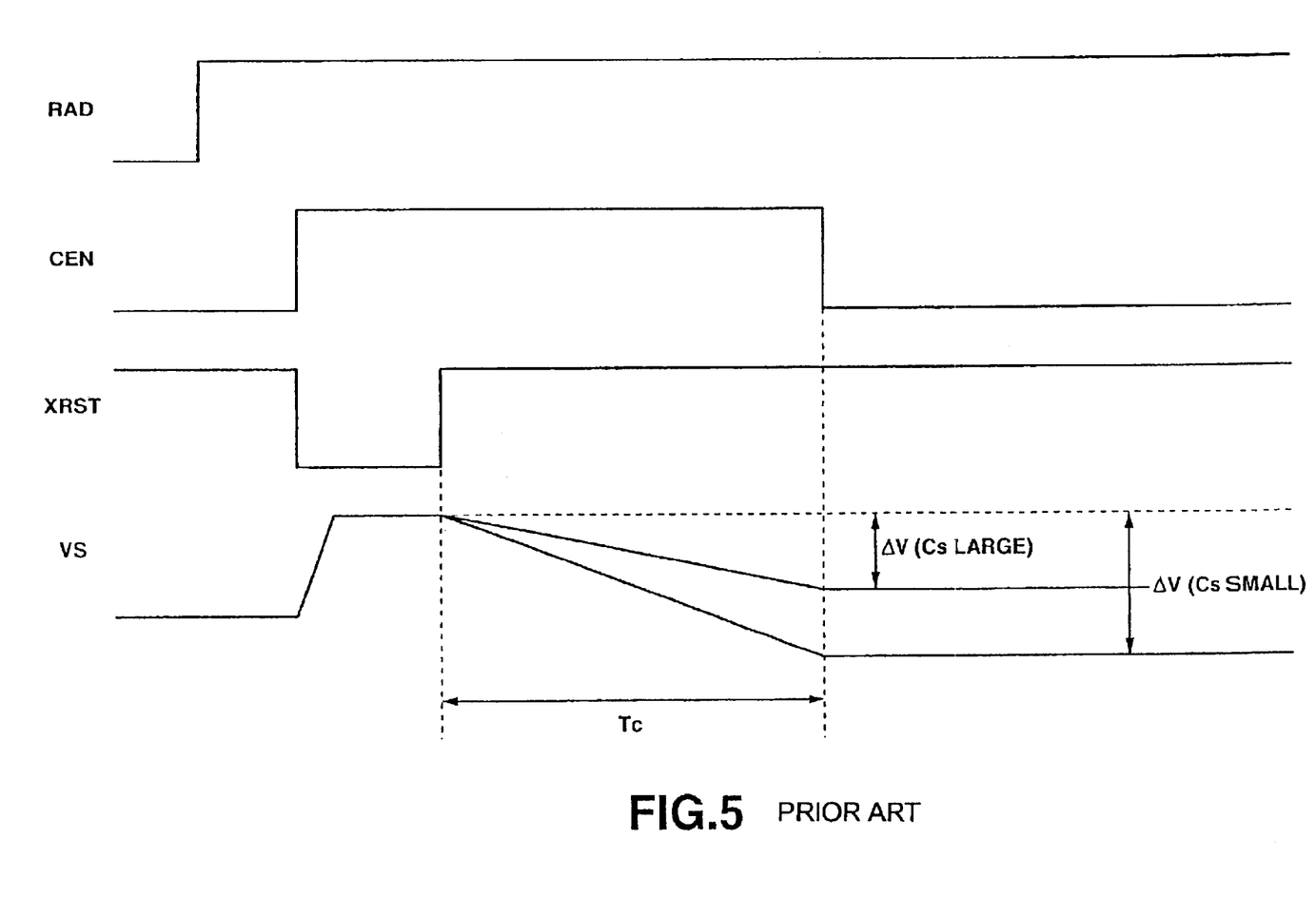
FIG. 5 is a timing chart for explaining the operations made in the charge charging method.

First, supplied with a row drive signal RAD having a high level (will be referred to as "H level" hereinafter) via the row drive line 111, the MOS transistor Q2 is turned on. Then, supplied with an H-level charge control signal CEN via the charge control line 15, the MOS transistor Q4 is turned on. Thus, a row is selected.

Simultaneously with this row selection, the MOS transistor Q3 is supplied with a reset signal XRST having a low level (will be referred to as "L level" hereinafter) via the reset line 114 and thus turned on. Thereby, the voltage at the sense electrode 101 (will be referred to as "sensed voltage" hereinafter) VS is reset to a source voltage VDD which is a reference voltage. Thereafter, the reset signal XRST changes to H level, so that the MOS transistor Q3 is turned off. Thus, charging of the sense electrode 101 with a charge by the current source Ic via the MOS transistor Q4 is started.

After a constant time Tc, the charge control signal CEN changes to L level and thus the MOS transistor Q4 is turned off. Thus, the charging of the sense electrode 101 with the charge is complete. A variation of the voltage on the sense electrode 101 after the resetting will be taken as a sensed voltage Vsns. It is connected to the column sense line 112 via the source-follower MOS transistor Q1 and row-select MOS transistor Q2, and delivered to the outside via the column sense line 112.

The sensed voltage Vsns will be as follows:

$$Vsns=(Ic \times Tc)/Cs$$

where Ic is a charge current to the capacitance Cs and Tc is a time of charging to the capacitance Cs. As will be evident from this expression, a reference charge (Ic×Tc) should be set small to increase the sensitivity of sensing the capacitance Cs within a limited dynamic range of the sensed voltage Vsns.

For an increased sensitivity of sensing the capacitance Cs in the voltage charging method, the charging voltage ΔV to the sense electrode 101 should be increased or the reference capacitance Cf should be small, as mentioned above. However, the charging voltage ΔV is limited by the source voltage to the apparatus, and, as the reference capacitance Cf is decreased, a disturbance noise or a circuit-operation noise will have an increased influence on the capacitance, resulting in a worse S/N (signal-to-noise) ratio. Also, for example, when an AC charge noise having an amplitude ΔQn takes place, the reference capacitance will have a noise charge of ΔQn added thereto in the worst case, which depends upon the charge and timing of sensing. The noise voltage will be ΔQn/Cf when converted into a voltage output from the sensing circuit 105m. When the reference capacitance Cf is decreased, the noise voltage will be higher, resulting in a worse S/N ratio.

On the other hand, in the charge charging method, setting the reference charge (Ic×Tc) smaller permits an increase in the sensitivity of sending the capacitance Cs within a limited dynamic range of the sensed voltage Vsns. However, when an AC charge noise having an amplitude of ΔQn takes place, the reference charge (Ic×Tc) will have a noise of ΔQn added thereto in the worst case. At this time, the S/N ratio is ΔQn/(Ic×Tc), and setting the reference charge (Ic×Tc) smaller will result in a worse SIN ratio.

Actually, when the aforementioned fingerprint sensor is installed in an electrical appliance such as a notebook personal computer (PC), since such an appliance is generally applied with a DC voltage from an AC source via a switching power source, a switching noise from the switching power source is superposed on an internal source voltage. Therefore, the switching noise will be an asynchronous disturbance noise, causing the worse S/N ratio and malfunction of the fingerprint sensor (capacitance sensor). That is, both the above two sensing methods, voltage charging and charge charging, are not advantageous in that they are limited in improving the sensitivity of sensing the capacitance and vulnerable to asynchronous disturbance noise.

DISCLOSURE OF THE INVENTION

Accordingly, the present invention has an object to overcome the above-mentioned drawbacks of the related art by providing a capacitance sensor capable of sensing a capacitance with a considerably improved sensitivity without any deteriorated S/N ratio and whose durability against asynchronous disturbance noise can considerably be improved, and a fingerprint identification system using the capacitance sensor.

The above object can be attained by providing a capacitance sensor including, according to the present invention, sensor cells, each including a sense electrode, a first switch connected between the sense electrode and the reference potential, and a second switch connected between the sense electrode and a sense line, a sensing means for storing, into a reference capacitance thereof, a charge outputted from the sensor cell to a sense line via the second switch and converting the charge into a voltage signal, and a controlling means for controlling the first switch to turn on and then off, and then the second switch to turn on, whereby the storage of the charge from the sensor cell into the reference capacitance of the sensing means is repeatedly done. The capacitance sensor is used as a fingerprint sensing means in a fingerprint identification system.

Also the above object can be attained by providing a capacitance sensor and a fingerprint identification system using the capacitance sensor as a fingerprint sensing means, in which a controlling means controls a first switch to turn on first to set a sense electrode to a reference potential, and turn off next and a second switch to turn on to form a short-circuit between the sense electrode and a sense line, so that the potential at the sense line will change and a charge will move from the sense electrode of a sensor cell to a reference capacitance of a sensing means via the second switch and sense line, and thus this series of operations is repeatedly done. With the repetition of the operations, an averaging (integration) is done to reduce noise components for extracting only single components. Also, since a signal to be sensed depends upon a number of times the operations are repeated, the sensitivity of sensing the capacitance can be raised by increasing the number of the repetitions.

These objects and other objects, features and advantages of the present invention will become more apparent from the following detailed description of the best mode for carrying out the present invention when taken in conjunction with the accompanying drawings.

BEST MODE FOR CARRYING OUT THE INVENTION

The present invention will be described in detail below, concerning an embodiment of the capacitance sensor and an embodiment of the fingerprint sensor in which the capacitance sensor is applied, with reference to the accompanying drawings.

Figure 6:
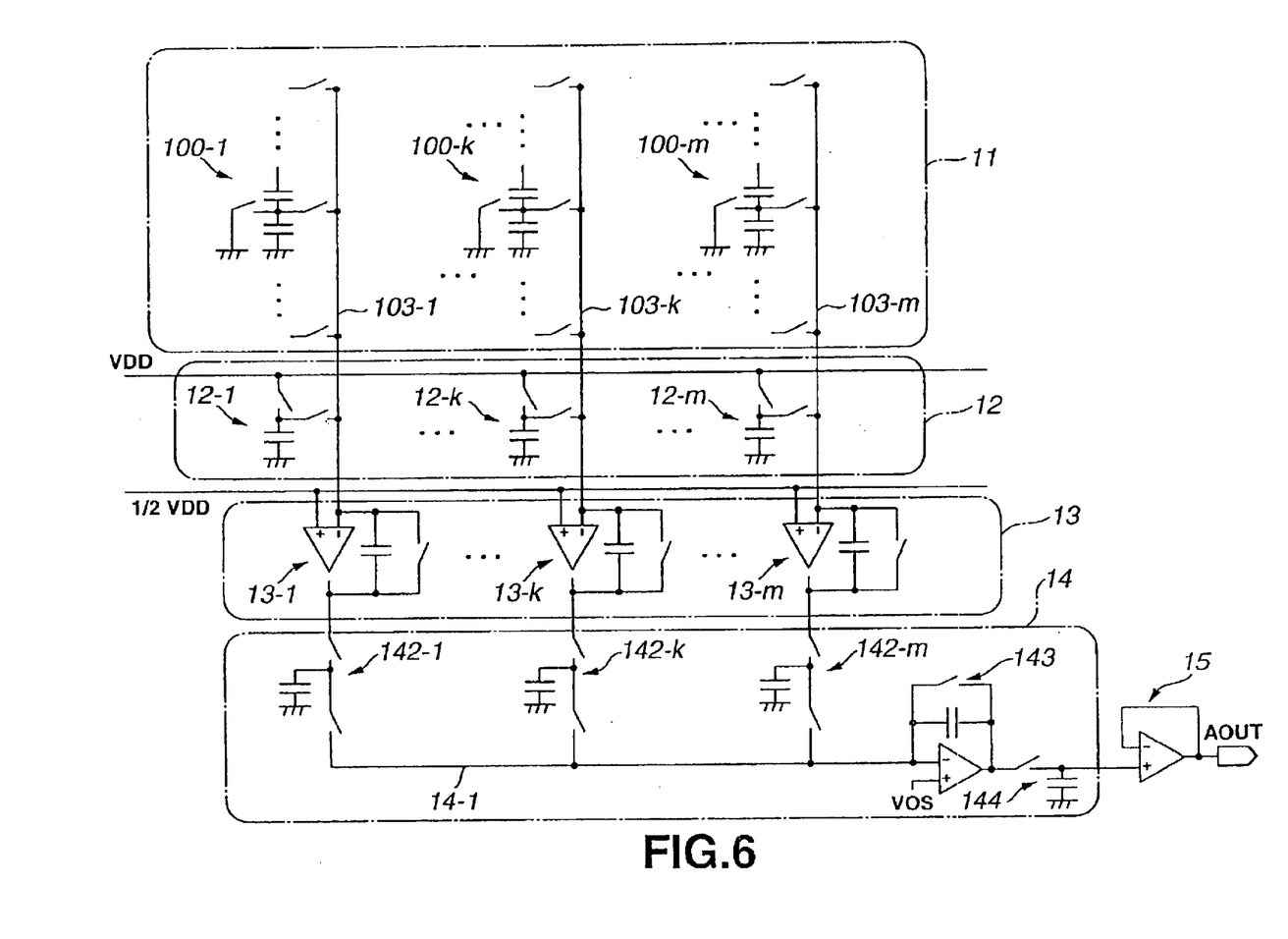
FIG. 6 is a circuit diagram of the capacitance sensor according to the present invention.

According to the present invention, the capacitance sensor is constructed as shown in FIG. 6. As shown in FIG. 6, the capacitance sensor includes a sensor array 11, parasitic capacitance cancel circuit 12, sensing circuit 13, parallel-serial conversion circuit 14 and an output circuit 15. The sensor array 11 is formed from an array including m columns by n rows of sense electrodes forming each sensor cell and laid on the surface of a semiconductor, as in FIG. 1. For the simplicity of the illustration and explanation, there is shown the cell circuit constructed of only one row of sensor cells $100\text{-}1, \ldots, 100\text{-}k, \ldots, 100\text{-}m$.

Note that the sensor array 11 has column sense lines 103-1, 103-$k$ and 103-$m$ laid in each column and row select lines laid on each line as in the aforementioned fingerprint sensor shown in FIG. 1, and it also includes a row drive circuit to drive the row select lines and a column drive circuit to provide a driving for serial conversion of a sensed voltage read in parallel to the parallel-serial conversion circuit 14 via the sensing circuit 13 and for delivering the serial signal.

Figure 7:
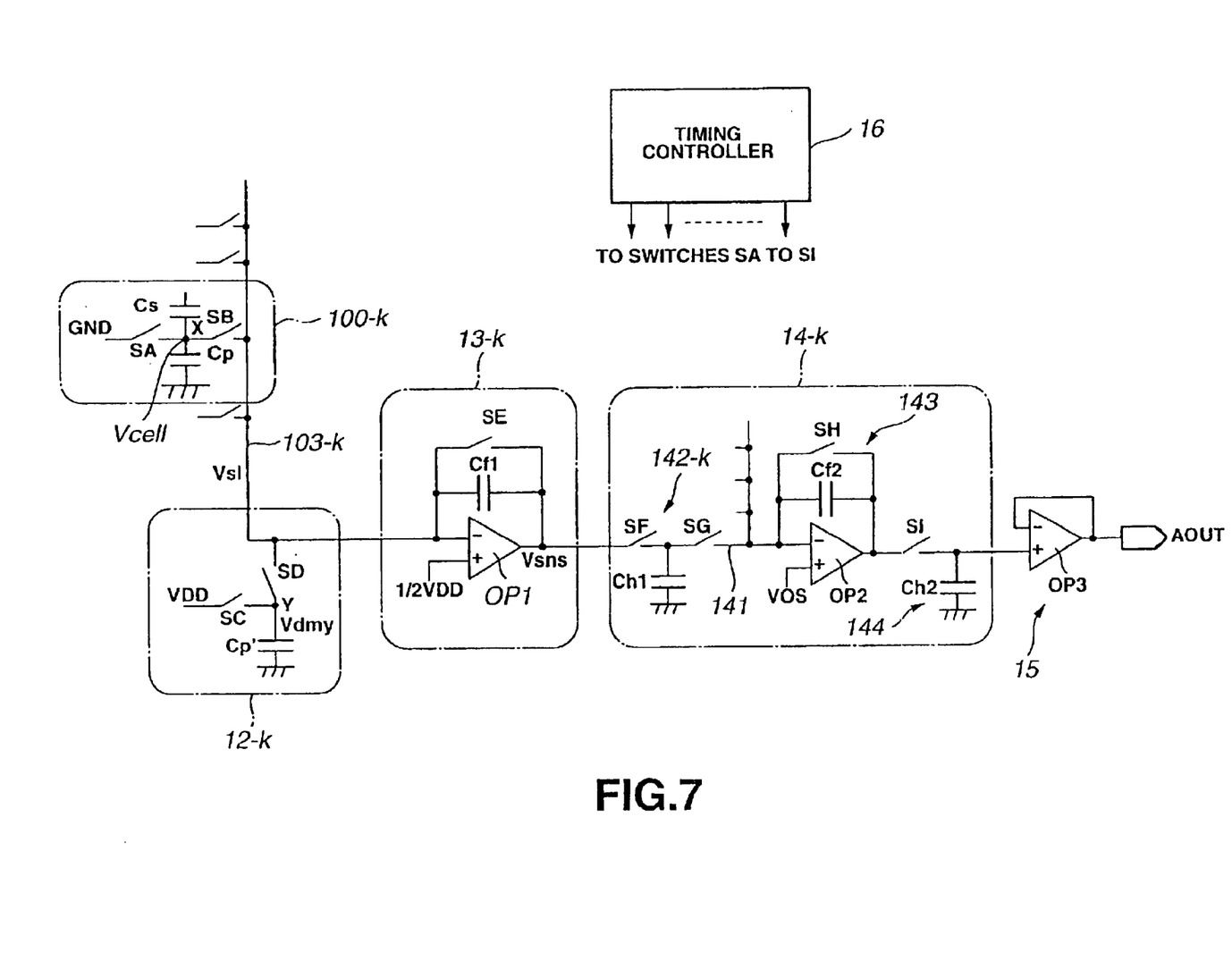
FIG. 7 is a circuit diagram of a circuitry formed from k columns.

The circuitry in the k-th column shown in FIG. 7, namely, the sensor cell 100-$k$, a parasitic capacitance cancel circuit 12-$k$, a sensing circuit 13-$k$ and a parallel-serial conversion circuit 14-$k$, will be described in detail by way of example.

In the sensor cell 100-$k$, the capacitance Cs is one developed between the sense electrode and the surface of a finger, and the capacitance Cp is a parasitic capacitance between the sense electrode and the semiconductor substrate. The sensor cell 100-$k$ has a first switch SA connected between a sense node X for sensing the capacitance Cs and a reference potential point (e.g., ground potential GND) and a second switch SB connected between the sense node X and the column sense line 103-$k$. It is assumed here that the switches SA and SB are driven and controlled by the row drive circuit shown in FIG. 1, only a selected row becomes active and in the cell in any row not selected, the switch SA remains on while the switch SB remains off.

The capacitance Cs is developed between the sense electrode and the finger surface, and a parasitic capacitance Cp exists also between the sense electrode and semiconductor substrate. When the capacitance Cs is sensed, an offset for the parasitic capacitance Cp will take place and limit the dynamic range of the sensing circuit 13. The parasitic capacitance cancel circuit 12-$k$ is provided to solve the problem caused by the capacitance Cp. To solve the problem, the parasitic capacitance cancel circuit 12-$k$ has, provided outside the sensor array 11 and in each column, a dummy electrode formed similarly to each sense electrode in the sensor array 11 (will be referred to as "dummy electrode" hereinafter). Therefore, a parasitic capacitance Cp' also will develop between the dummy electrode and semiconductor substrate, as in each sense electrode in the sensor array 11. In this parasitic capacitance cancel circuit 12-$k$, a switch SC is connected between a sense point Y of the parasitic capacitance Cp' and a reference potential point, namely, a source voltage VDD. Also, a switch SD is connected between the sense point Y and a column sense like 103-$k$.

The sensing circuit 13-$k$ includes an operational amplifier OP1 having the negative-phase input terminal thereof connected to one end of the column sense line 103-$k$, a reference capacitance Cf1 connected to the negative-phase input terminal and output terminal of the operational amplifier OP1, and a reset switch SE connected in parallel to the reference capacitance Cf1. The operational amplifier OP1 has a voltage equal to a half of the source voltage VDD(=VDD/2) connected to the positive-phase input terminal thereof.

The sensing circuit 13-$k$ has a parallel-serial conversion circuit 14 connected to the output terminal thereof. The parallel-serial conversion circuit 14 includes a first sample & hold circuit 142-$k$ provided for each column between the output terminal of the sensing circuit 13-$k$ and output signal line 141, an output amplifier 143 connected at the input terminal thereof to the output signal line 141, and a second sample & hold circuit 144 connected at the input terminal thereof to the output terminal of the output amplifier 143.

The first sample & hold circuit 142-$k$ includes a sampling switch SF and a column select switch SG, connected in series between the output terminal and output signal line 141 of the sensing circuit 13-$k$, and a hold capacitance Ch1 connected between the common junction between these switches SF and SG and the ground potential. The output amplifier 143 includes an operational amplifier OP2, which is supplied with a reference voltage VOS as a positive-phase input and also with a sensed voltage Vsns supplied from the sensing circuit 13-$k$ via the sample & hold circuit 142-$k$, as a negative-phase input, a reference capacitance Cf2 connected between the negative-phase input terminal and the output terminal of the operational amplifier OP2, and a reset switch SH connected in parallel to the reference capacitance Cf2.

The second sample & hold circuit 144 includes a sampling switch SI connected at the input terminal thereof to the output terminal of the output amplifier 143, that is, to the output terminal of the operational amplifier OP2, and a hold capacitance Ch2 connected between the output terminal of the sampling switch SI and the ground potential. The output circuit 15 includes an operational amplifier OP3 that is supplied with a hold output from the hold capacitance Ch2 in the second sample & hold circuit 144, as a positive-phase input, and which has a negative-phase input terminal and output terminal thereof short-circuited to each other.

Figure 8:
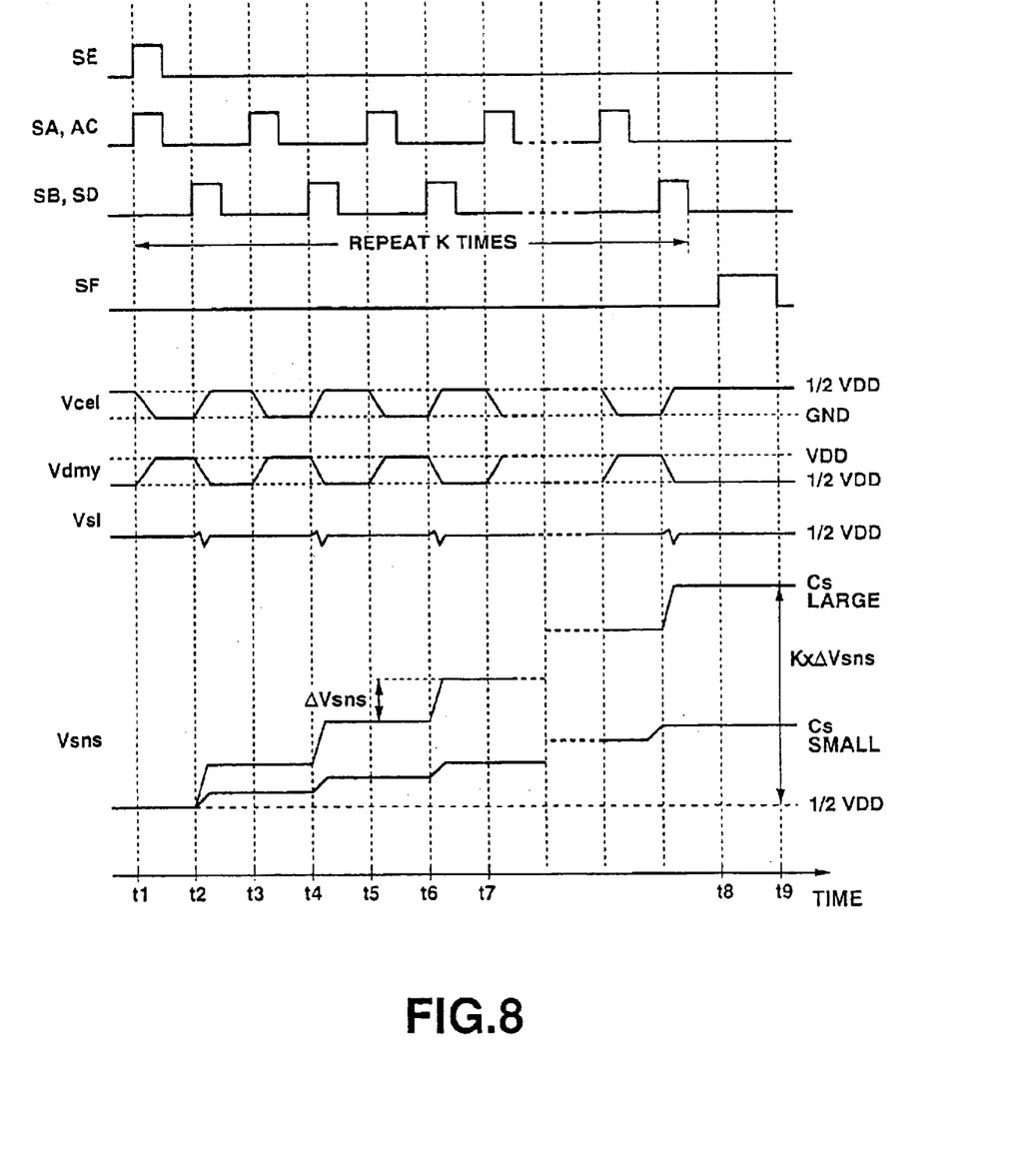
FIG. 8 is a timing chart for explaining the circuit operations of the capacitance sensor according to the present invention.

Next, the circuit operation of the capacitance sensor according to the present invention will be described concerning the k-th column circuitry shown in FIG. 7 with reference to the timing chart in FIG. 8. It should be noted that in the timing chart in FIG. 8, the H and L levels of signals concerning the switches SA to SF mean "on" and "off", respectively, all the switches SA to SF are "off" in their initial states and the switches SA to SI are turned on and off by a timing controller 16.

First, at a time t1, the reset switch SE of the sensing circuit 13-$k$ is turned on to zero the charge in the reference capacitance Cf1. At this time, the column sense line 103-$k$ is virtually grounded to VDD/2 under the action of the operational amplifier OP1. At the same time, the switch SA of the sensor cell 100-$k$ is turned on to set the potential Vcell of the sense electrode to the ground potential level, and the switch SC of the parasitic capacitance cancel circuit 12-$k$ is turned on to set the potential Vdmy at the dummy electrode to VDD level.

At this time, both the switch SB of the sensor cell 100-$k$ and the switch SD of the parasitic capacitance cancel circuit 12-$k$ are off. Thereafter, the reset switch SE of the sensing circuit 13-$k$, the switch SA of the sensor cell 100-$k$ and switch SC of the parasitic capacitance cancel circuit 12-$k$ are all turned off. At each node, since the charge is held, no change will take place in potential.

Next, at a time t2, the switch SB of the sensor cell 100-$k$ is turned on to short-circuit the sense electrode and the column sense line 103-k to each other. At this time, since the column sense line 103-k is virtually grounded to VDD/2 by the sensing circuit 13-k, the potential Vcell at the sense electrode changes from the ground potential level to VDD/2 level. Because of this potential change, a charge of $-\{(VDD/2) \times (Cs+Cp)\}$ moves from the sense electrode to the reference capacitance Cf1 of the sensing circuit 13-k through the switch SB.

At the time t2, the switch SD of the parasitic capacitance cancel circuit 12-k is turned on to short-circuit the dummy electrode and the column sense line 103-k to each other. At this time, since the potential Vdmy at the dummy electrode changes from VDD to VDD/2, a charge of $(VDD/2) \times Cp'$ moves from the dummy electrode to the reference capacitance Cf1 of the sensing circuit 13-k through the switch SD.

Eventually, since a charge of $-\{(VDD/2) \times (Cs+Cp-Cp')\}$ is stored in the reference capacitance Cf1, the sensed voltage Vsns of the sensing circuit 13-k will be as follows:

$$Vsns = VDD/2 + \{(VDD/2) \times (Cs+Cp-Cp')\}/Cf1$$

By designing the dummy electrode so that Cp=Cp', the sensed voltage Vsns will be as follows:

$$Vsns = VDD/2 + \{(VDD/2) \times Cs\}/Cf1$$

Thus, the offset by the parasitic capacitance Cp of the sense electrode can be canceled.

Thereafter, both the switch SB of the sensor cell 100-k and the switch SD of the parasitic capacitance cancel circuit 12-k are turned off. At each node, since the charge is held, no change in potential will take place.

At a time t3, both the switch SA of the sensor cell 100-k and the switch SC of the parasitic capacitance cancel circuit 12-k are turned on to set the potential Vcell at the sense electrode to the ground potential level and the potential Vdmy at the dummy electrode to the VDD level. Then, the aforementioned series of operations made with the switches SA, SC, SB and SD being turned on and off, that is, the series of operations made at the times t1 to t3, is repeated at subsequent times t3 to t5, t5 to t7, . . . , in this order.

Each time the series of operations is repeated, the sensed voltage Vsns in the sensing circuit 13-k is increased by:

$$\Delta Vsns = \{(VDD/2) \times Cs\}/Cf1 = \{VDD/(2 \times Cf1)\} \times Cs$$

When the series of operations has been repeated about k times in total, the sensed voltage Vsns will be as follows:

$$Vsns = VDD/2 + K \times \Delta Vsns = VDD/2 + K \times \{VDD/(2 \times Cf1)\} \times Cs.$$

After the series of operations at the times t1 to t3 has been repeated K times, both the switch SB of the sensor cell 100-k and switch SC of the parasitic capacitance cancel circuit 12-k are turned off. At a time t8, the sampling switch SF of the first sample & hold circuit 142-k in the parallel-serial conversion circuit 14 is turned on. Thus, the sensed voltage Vsns in the sensing circuit 13-k is loaded to the first sample & hold circuit 142-k and held in the hold capacitance Ch1.

In the foregoing, the operations of the k-th column circuitry has been described by way of example. The aforementioned operations will be done simultaneously row by row in each column. In the parallel-serial conversion circuit 14, the voltage held in each hold capacitance Ch1 in the first sample & hold circuits 142-1 to 142-m in each column is converted from parallel to serial when column select switches SG of the first sample & hold circuits 142-1 to 142-m are sequentially turned on and off by column drive signals sequentially supplied from a column drive circuit (not shown) and delivered via the output signal line 141, output amplifier 143 and second sample & hold circuit 144.

As described above, in the capacitance sensor according to the present invention, the switch SA of the sensor cell 100-k is first turned on under the switching control of the timing controller 16 to set the potential at the sensed voltage to the reference potential (GND in this embodiment), and then after the switch SA is turned off, the switch SB is turned on to store the charge in the sensor cell 100-k charge in the reference capacitance Cf1 of the sensing circuit 13-k. This operation is repeatedly done until the following signal Vsig is sensed:

$$Vsig = K \times \{VDD/(2 \times Cf1)\} \times Cs.$$

Therefore, by increasing the number K of times the charge in the sensor cell 100-k is stored in the reference capacitance Cf1 of the sensing circuit 13-k, the output sensitivity (sensitivity of sensing the capacitance) can be raised. So, since the sensitivity of sensing the capacitance can be raised by changing the number K of times, it is not necessary to control externally the charging voltage for supply to the positive-phase input terminal of the operational amplifier OP1 in the sensing circuit 13-k, as in the conventional voltage charging method.

Since the sensitivity of sensing the capacitance can be improved considerably by increasing the number K of times as above, the overcoat (equivalent to the overcoat 104 in FIG. 2) over the sense electrodes of the sensor cell 100-k can be increased in thickness, and thus the surface strength and electrostatic resistance of the sensor cell 100-k can be improved. Also, since the sensitivity of sensing the capacitance can be controlled by setting the number K of times, that is, digitally, the sensitivity adjusting D-A converter is not required, which will contribute much to simplification and cost reduction of the circuit construction of the whole apparatus.

It will be considered here that the capacitance sensor is applied with an AC charge noise having an amplitude of $\Delta Qn$. The capacitance sensor will be applied with a worst noise of $\Delta Qn$. In comparison with the conventional voltage charging method, however, as the storage of the charge in the sensor cell 100-k into the reference capacitance Cf1 of the sensing circuit 13-k is repeatedly done, the averaging (integration) is made to reduce the noise components and only the signal components are extracted. So, by setting the same sensitivity of sensing the capacitance as in the conventional capacitance sensor, the reference capacitance Cf1 can be increased K times as compared with that in the conventional capacitance sensor. Therefore, the noise charge $\Delta Qn$ will cause the sensing circuit 13-k to provide an output voltage $\Delta Qn/Cf1$ which is 1/K, so that the S/N ratio can be improved K times and the capacitance sensor according to the present invention can endure the disturbance noise.

In the foregoing description of the capacitance sensor according to the present invention, the reference voltage as the charging voltage in the sensor cell 100-k is the ground potential level, which, however, is just an example, and to which the present invention is not limited. However, use of the ground potential level as the reference voltage will be preferable, since it will permit obtaining a charging voltage using a potential in the semiconductor substrate easily connectable in the sensor cell 100-k, and the wiring can be omitted correspondingly.

In the foregoing, the embodiment in which the capacitance sensor according to the present invention is used as a fingerprint sensor has been described by way of example. However, the capacitance sensor according to the present invention is not limited to the application for fingerprint sensing but is usable to sense a whole pattern of irregularities of a capacitance Cs developed between sense electrodes and an overcoat (equivalent to the overcoat 104 in FIG. 2) over the sense electrodes of the sensor cell 100-k when it is placed on the overcoat.

Figure 9:
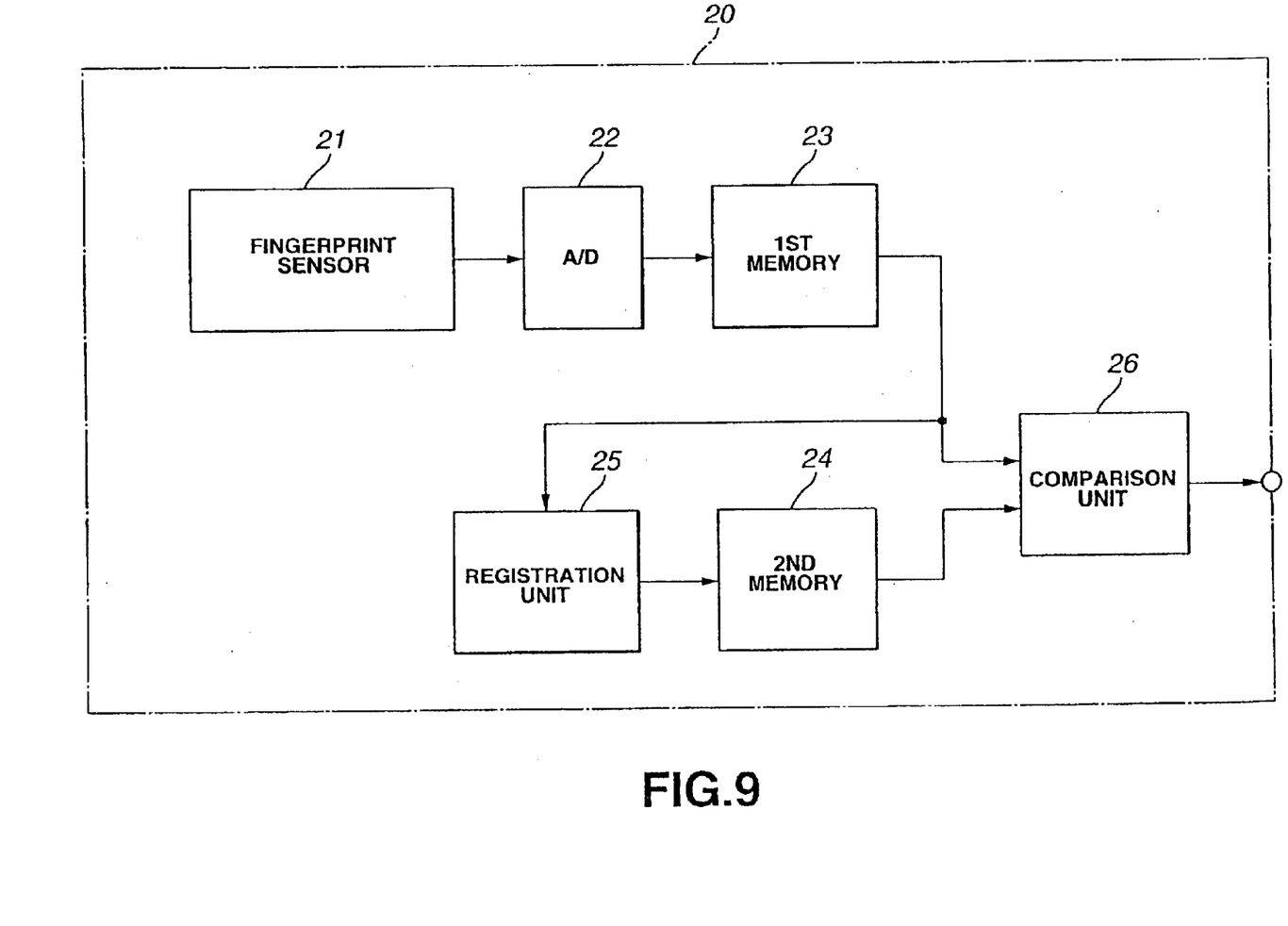
FIG. 9 is a block diagram of an example of the fingerprint identification system according to the present invention.

FIG. 9 is a block diagram of an embodiment of the fingerprint identification system according to the present invention, in which the aforementioned capacitance sensor is used as a fingerprint sensor. As shown in FIG. 9, the fingerprint identification system is generally indicated with a reference 20, and it includes a fingerprint sensor 21, an A-D converter 22, first and second memories 23 and 24, registration unit 25 and a comparison unit 26.

In the fingerprint identification system 20 shown in FIG. 9, the capacitance sensor described above is used as the fingerprint sensor 21. That is, after setting the potential at the sense electrode in the sensor cell to the reference potential level, the fingerprint sensor 21 repeatedly stores the charge into the reference capacitance in the sensing circuit, thereby sensing the capacitance Cs developed between the sense electrode and finger surface corresponding to the irregularities of the finger surface with a high sensitivity to obtain fingerprint information.

The voltage output from the fingerprint sensor 21 is converted into a digital form by the A-D converter 22 and then stored into the first memory 23. The registration unit 25 is used for pre-registration of a fingerprint pattern that is used in the fingerprint identification system. When registering a fingerprint pattern, for example, only features are extracted from fingerprint information stored in the first memory 23, and information on the feature group is stored as a registered pattern information into the second memory 24.

The comparison unit 26 is provided to compare the sensed fingerprint information detected by the fingerprint sensor 21 and stored in the first memory 23 with the registered pattern information pre-stored as the features in the second memory 24, for example. When the sensed fingerprint information is coincident with the registered pattern information, the comparison unit 26 will determine that the fingerprint sensed by the fingerprint sensor 21 is the pre-stored fingerprint and deliver the result of dactyloscopy to outside.

Note that in this embodiment of the fingerprint identification system 20, fingerprint information sensed by the fingerprint sensor 21 is stored once in the first memory 23 but the first memory 23, may be omitted in case it is not required for the convenience of signal processing.

Figure 10:
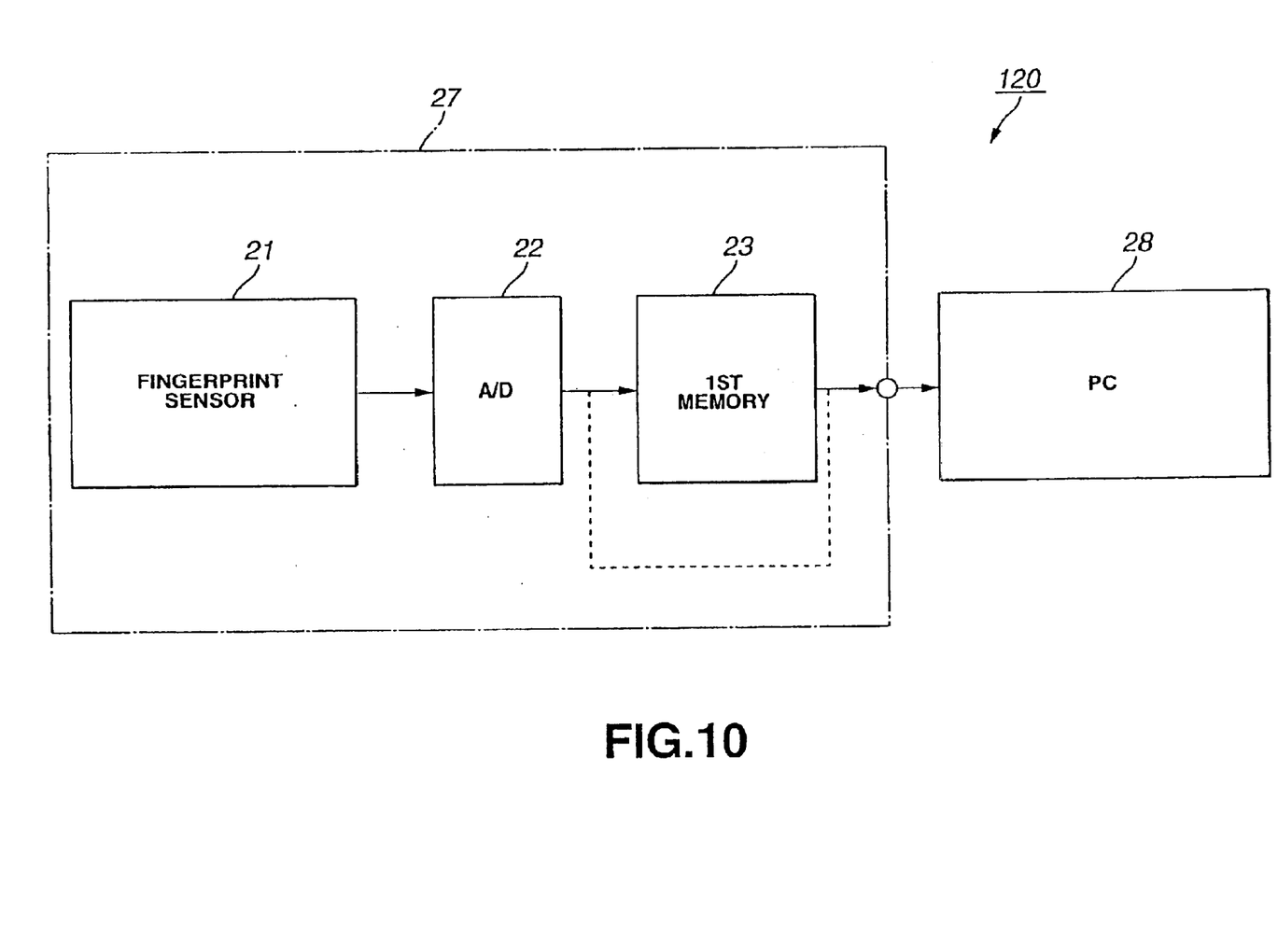
FIG. 10 is a block diagram of another example of the fingerprint identification system according to the present invention.

As shown in FIG. 10, the fingerprint identification system may be implemented as a one generally indicated with a reference 120, including the fingerprint sensor 21, the A-D converter 22 and the first memory 23, all enclosed in one unit 27, and adapted such that an output from the unit 27 is supplied to a personal computer (PC) 28 having the functions of the second memory 24, the registration unit 25 and the comparison unit 26. It should be noted that the first memory 23 may be omitted, as indicated with a broken line in FIG. 10.

INDUSTRIAL APPLICABILITY

As has been described in the foregoing, according to the present invention, a potential at the sense electrode in the sensor cell is set to the reference potential, and then the storage of the charge into the reference capacitance is repeated. Thus, since the sensitivity of sensing the capacitance can be considerably improved, the thickness of the overcoat over the sense electrodes can be increased to improve the surface strength and electrostatic resistance of the sensor cell. Also, since the asynchronous disturbance noise resistance can be considerably improved, the power noise can be suppressed easily.

What is claimed is:

1. A capacitance sensor comprising:

sensor cells each including a sense electrode, a first switch connected between the sense electrode and reference potential, and a second switch connected between the sense electrode and a sense line;

a sensing means for storing, into a reference capacitance thereof, a charge outputted from the sensor cell to a sense line via the second switch and converting the charge into a voltage signal; and a controlling means for controlling the first switch to turn on and then off, and then the second switch to turn on, whereby the storage of the charge from the sensor cell into the reference capacitance of the sensing means is repeatedly done, wherein the controlling means controls the capacitance sensing sensitivity of the sensing means by changing the number of times the storage of the charge from the sensor cell into the reference capacitance of the sensing means is repeated.

2. The apparatus as set forth in claim 1, formed from a semiconductor device.

3. The apparatus as set forth in claim 2, wherein the reference potential is a potential in a semiconductor substrate.

4. The apparatus as set forth in claim 1, wherein:

the sensor cells are laid in the form of an array; and the sensing means senses a capacitance developed between the sense electrode and a finger surface to obtain fingerprint information by storing the charge of the sensor cell into the reference capacitance thereof.

5. A fingerprint identification system, comprising:

a fingerprint sensing means including:

a sensor array in which there are laid in the form of an array sensor cells each including a sense electrode, a first switch connected between the sense electrode and reference potential, and a second switch connected between the sense electrode and a sense line; and a sensing means for sensing a capacitance developed between the sense electrode and a finger surface to obtain fingerprint information by storing, into a reference capacitance, a charge outputted from the sensor cell to the sense line via the second switch; and a controlling means for controlling the first switch to turn on and then off, and then the second switch to turn on, whereby the storage of the charge from the sensor cell into the reference capacitance of the sensing means is repeatedly done;

a storage means for storing pattern information on pre-registered fingerprints; and a comparison means for comparing fingerprint information obtained by the fingerprint sensing means with the registered pattern information stored in the storage means and outputting the result of comparison as a result of fingerprint identification, wherein the controlling means controls the sensitivity of the fingerprint sensing means by changing the number of times the storage of the charge from the sensor cell into the reference capacitance of the sensing means is repeated.

* * * * *

UNITED STATES PATENT AND TRADEMARK OFFICE
CERTIFICATE OF CORRECTION

PATENT NO. : 6,882,164 B2
DATED : April 19, 2005
INVENTOR(S) : Motoyasu Yano et al.

It is certified that error appears in the above-identified patent and that said Letters Patent is hereby corrected as shown below:

<u>Title page</u>,
Item [54], Title, "COLLATOR COMPRISING IT" should read -- APPARATUS USING THE SAME --.

Signed and Sealed this

Thirtieth Day of August, 2005

JON W. DUDAS
*Director of the United States Patent and Trademark Office*